Jan. 3, 1950     K. H. BROWNLEE     2,493,522
METHOD AND APPARATUS FOR APPLYING TRANSFERS
Filed Jan. 17, 1945     6 Sheets-Sheet 3

Inventor:
Kenneth H. Brownlee
By: Harold Olsen
Attorney

Jan. 3, 1950  K. H. BROWNLEE  2,493,522
METHOD AND APPARATUS FOR APPLYING TRANSFERS
Filed Jan. 17, 1945  6 Sheets-Sheet 4

Inventor:
Kenneth H. Brownlee
By: Harold Olsen
Attorney

Jan. 3, 1950    K. H. BROWNLEE    2,493,522
METHOD AND APPARATUS FOR APPLYING TRANSFERS
Filed Jan. 17, 1945    6 Sheets-Sheet 5

Inventor:
Kenneth H. Brownlee
By: Harold Olsen
Attorney.

Jan. 3, 1950        K. H. BROWNLEE        2,493,522
METHOD AND APPARATUS FOR APPLYING TRANSFERS
Filed Jan. 17, 1945        6 Sheets-Sheet 6

Inventor:
Kenneth H. Brownlee
By Harold Olsen
Attorney

Patented Jan. 3, 1950

2,493,522

UNITED STATES PATENT OFFICE 2,493,522

METHOD AND APPARATUS FOR APPLYING TRANSFERS

Kenneth H. Brownlee, Skokie, Ill., assignor to The Meyercord Co., Chicago, Ill., a corporation of Illinois Application January 17, 1945, Serial No. 573,250

5 Claims. (Cl. 154—99)

My invention relates to improvements in the method of applying transfers to articles or packages and in apparatus adapted for carrying out my method.

By the word "transfer," as used herein, I mean a transferable imprint such as the well known decalcomania. I do not, however, wish to limit myself to any particular type of imprint or decalcomania, it being sufficient for the purposes of my invention that the imprint shall be transferable from the usual backing or supporting sheet to the object upon which it is desired that the imprint shall appear.

Generally speaking, there are two types of decalcomania or transfers now in use: one, the type in which the imprint is removed from the backing sheet by moistening, as with water, and the other, the type in which the imprint is transferred by the application of heat. In my new method and apparatus I contemplate the use of the heat transferable type of decalcomania.

Decalcomania transfers are extensively employed as revenue stamps for taxed articles and also as trademark labels and other forms of indicia for indicating origin or quality of goods. Where the common form of water transferable decalcomania is used, the transfers are customarily removed from the backing sheet and transposed to the objects or articles by manual operation which is tedious and expensive.

I am aware of the fact that it has been proposed to apply water transferable decalcomania by means of automatic machinery but such machines as have been designed for this purpose are very large, cumbersome and expensive, and are not practical for the intended purpose.

I have chosen to describe my invention in connection with the application of revenue stamps to cigarette packages. As is well known, nearly all of the States and many municipalities impose a tax on cigarettes and the payment of the tax is required to be evidenced by a revenue stamp of some sort affixed to each package. The duty of affixing the revenue stamp devolves upon the distributor in the particular locality where the tax is exacted.

Revenue stamps for such articles as cigarettes, as now generally used, are of two kinds: one, the water transferable decalcomania, and the other, merely a printed impression from a steel die or rubber stamp. The decalcomania are affixed to the individual packages by hand. Where a stamp impression is permitted, this is generally accomplished by passing the packages through a machine similar to a postage metering machine.

Printed impressions such as may be made from a rubber stamp or the like are not the most desirable form of revenue stamp because they can easily be simulated or counterfeited. Decalcomania stamps are preferred because they can be produced in colors and designs that are difficult to counterfeit and a decalcomania film is so fragile that the stamp cannot be removed without destruction or at least without leaving evidence of tampering. But, as above indicated, the use of decalcomania revenue stamps entails the extra labor and expense of affixing them manually and separately to each individual package.

It is, therefore, the principal object of my invention to provide a new method of applying decalcomania transfers or imprints automatically.

A further object of the invention is to provide a method of applying heat transferable decalcomania or imprints to articles or packages.

Still another object of the invention is to provide a method of applying heat transferable decalcomania or imprints to articles which includes the step of automatically and mechanically peeling the backing sheet or support from the decalcomania or imprints after they have been affixed to the articles.

And still another object of the invention is to provide a method of simultaneously applying decalcomania to a plurality of articles enclosed within a container.

As the title of this application indicates, I have also provided a form of apparatus for applying transfers to articles. With respect to said apparatus, it is the principal object of my invention to provide a machine for automatically applying decalcomania to a plurality of articles simultaneously.

A further object of the invention is to provide a machine for applying heat transferable decalcomania to articles, which machine is provided with means for automatically peeling away the backing or supporting sheet after the decalcomania have been transferred.

Still another object of the invention is to provide a machine for applying decalcomania to a plurality of articles enclosed within a container, which machine includes means for opening the container sufficiently to permit the entry of a sheet containing a plurality of decalcomania or transfers.

Other objects of the invention and the numerous advantages thereof will be more fully brought out as the description proceeds.

In the accompanying drawings, I have illustrated a practical embodiment of my invention in the form of a machine for applying decalcomania to the individual cigarette packages contained within a carton. These drawings are illustrative only and it is to be understood that I do not confine myself to the particular details of construction therein shown. It is also obvious that the invention may be embodied in numerous other forms for applying decalcomania or other types of transfers to a great variety of articles other than cigarette packages. Those skilled in the art will readily understand how my invention may be employed for a great many other purposes and how it may be embodied in many different forms without sacrificing any of its advantages and without departing from the scope of the invention as defined in the appended claims.

Referring now to the drawings, the reference numeral 1 indicates a base or bedplate provided at its opposite edges with upstanding side plates 2. Near their front edges, the said side plates are provided with grooves 3 and 4 in which are mounted for vertical sliding movement the container-opening or shearing blade and the transfer-carrying blade presently to be described.

In the forward grooves 3 is mounted for vertical sliding movement a container-opening or shearing blade 5. Said blade is provided upon its front surface, and near its marginal edges, with racks 6 engaged by pinions 7 on a shaft 8 adapted to be turned by a suitable handle 9. This arrangement is such that by turning the handle 9 in one direction the blade 5 will be moved downwardly in the grooves 3 and by turning the handle 9 in the opposite direction the said blade 5 will be raised vertically in said grooves 3.

As indicated, the said blade 5 is for the purpose of opening a container in which are housed the articles to which transfers, such as revenue stamps, are to be applied. The said blade 5 has a shearing edge of inverted V-shape form as indicated in the front elevation of Fig. 15.

Figure 7:
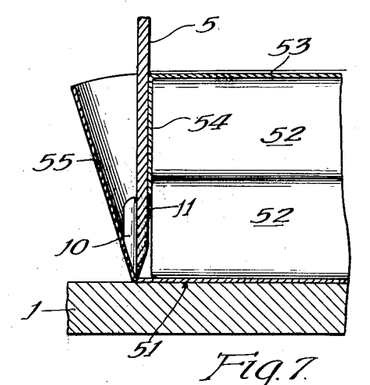
Fig. 7 is a fragmentary view in section of a front corner of a carton showing the opening or shearing blade in position.
Figure 8:
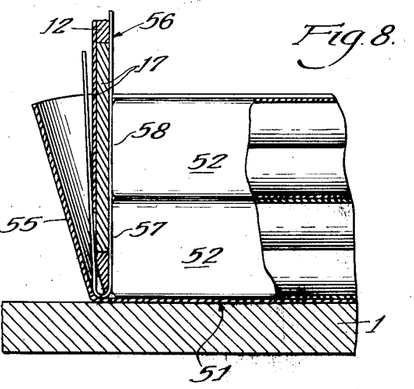
Fig. 8 is a view similar to Fig. 7 showing the heating element in position and the location of the sheet containing the decalcomania stamps or transfers.
Figure 15:
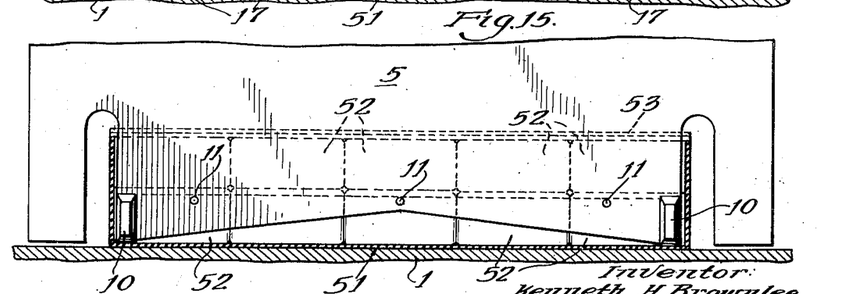
Fig. 15 is a view principally in elevation of the shearing or opening blade as seen on line 15—15 of Fig. 12.

Also, as indicated in Fig. 15 (as well as in the enlarged detail Fig. 7), the said blade 5 is provided adjacent its lower corners with lugs or bosses 10 for the purpose of pressing outwardly a container or carton wall, as indicated in said Fig. 7 so as to break the seal between said wall and a cover flap and to assure a substantial opening through which, in a subsequent operation, the stamp-applying blade may be inserted.

Figures 3, 4, 5:
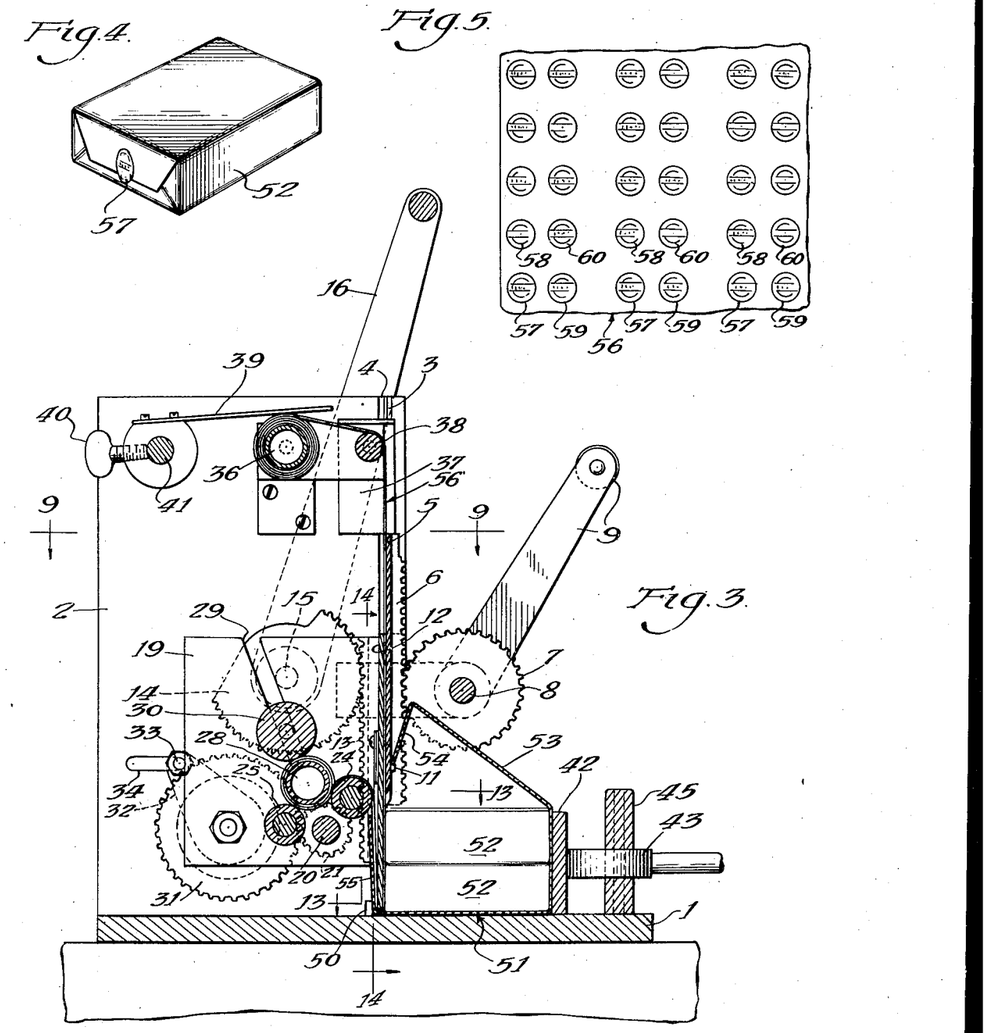
Fig. 3 is a view in section taken substantially on line 3—3 of Fig. 1.
Fig. 4 is a perspective view of a cigarette package showing my decalcomania applied thereto.
Fig. 5 is a fragmentary view of a sheet of decalcomania transfers such as may be employed in connection with my method and apparatus.
Figure 6:
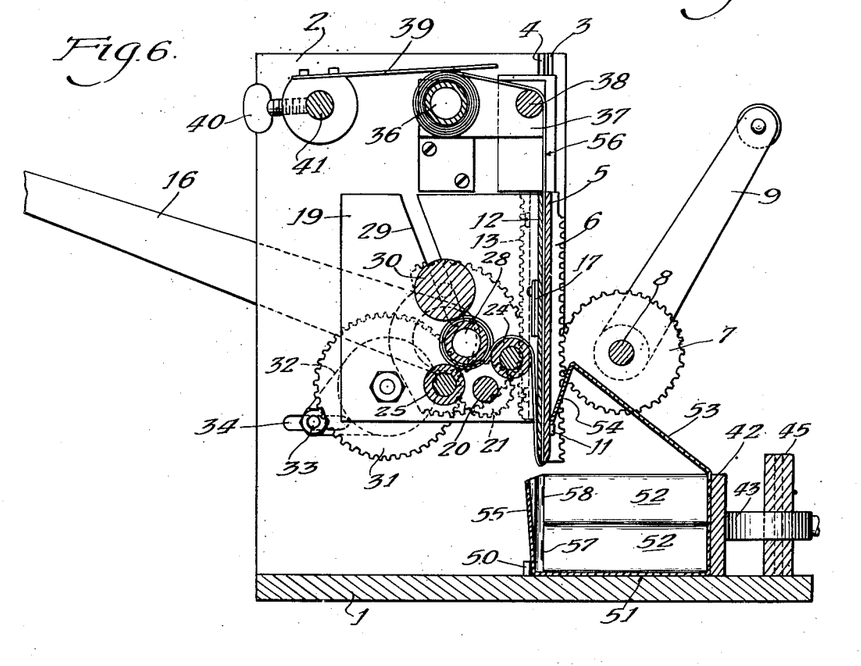
Fig. 6 is a sectional view similar to Fig. 3 showing the parts of the machine in the position they occupy immediately after a transfer or application of stamps has been completed and the backing sheet has been peeled away.

Upon the opposite face of the blade 5, I provide a number of projections 11 for the purpose of engaging the lower edge of the inturned flap of a carton or container cover so as to raise the said flap upwardly into the position shown in Figs. 3 and 6, whereby to expose the ends of the articles or packages within the container to the stamp or decalcomania-applying mechanism.

By reference to the drawings, it will be understood that when the handle 9 is moved rearwardly (that is, to the left), as shown in Figs. 3 and 6, the shearing blade 5 is moved downwardly into the carton or container. Upon turning the handle 9 in the opposite direction (that is, to the right), as shown in Figs. 3 and 6, the blade 5 is moved upwardly, whereupon the projections 11 engage the bottom edge of the inturned flap of the cover to raise the same into the position shown in said Figs. 3 and 6.

In the grooves 4 is slidably mounted a stamp or decalcomania-applying blade 12. This blade is provided with racks 13 which are engaged by pinions 14 on a shaft 15 adapted to be turned by a handle 16.

When the said handle 16 is in substantially upright position, as shown in Fig. 3, the said stamp-applying blade 12 is substantially at its lowest position in the grooves 4. Upon turning of the handle 16 to the left (as shown in Fig. 6), the said pinions 14 operate on the racks 13 to elevate the said blade to its upper position in the grooves 4, as indicated in said Fig. 6.

Figure 14:
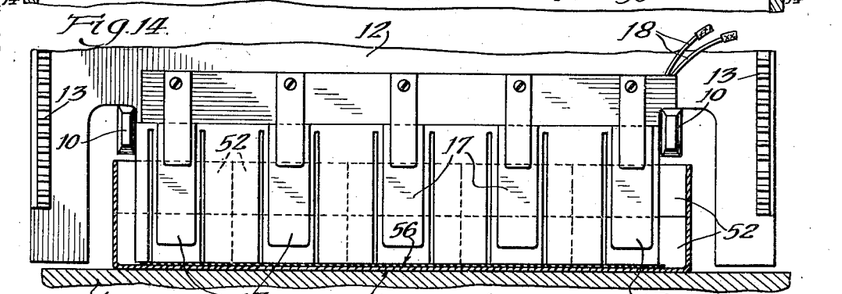
Fig. 14 is a front elevation of the heating elements as seen on line 14—14 of Fig. 13.

The stamp or decalcomania-applying blade carries along its lower edge a plurality of heating elements 17, as more particularly shown in Fig. 14. These heating elements are preferably heated by electricity, receiving their electric current through conductors 18 from any suitable source of electric energy.

The said heating elements may be inserted in the metal plate comprising the blade 12, or they may, if desired, be separate elements depending from the stamp-applying blade 12. Where the heating elements 17 are thus separate, the space between them will prevent the conduction of heat and will confine the application of heat to the precise area of the backing sheet upon which are located the decalcomania to be transferred.

If desired, the space between the heating elements 17 may be filled by another series of similar heating elements so as to provide two separate sets of heating elements which may be selectively employed to effect transfer of selected impressions from the backing sheet.

The stamp or decalcomania-applying blade 12 carries at its rear the plates 19 which constitute a backing sheet take-up carriage. Mounted between said plates 19 and near their bottom edges is a rotatable shaft 20 having gears 21 and 22.

Also mounted in the plates 19, and extending between them, are the friction rollers 24 and 25. These rollers are covered with suitable friction material such, for example, as rubber, which will assure firm contact between their surfaces and the backing sheet and the take-up roller presently to be described.

The friction rollers 24 and 25 are provided at one end with gears 26 and 27, respectively, which mesh with the gear 22 on the shaft 20. This arrangement is such that whenever the shaft 20 is rotated, there will be a resultant rotation of the gears 26 and 27 in the same direction and thereby the friction rollers 24 and 25 will be operated to cause winding of the backing sheet from which the decalcomania or stamps have been transferred.

A take-up roller 28 is mounted in inclined slots 29 formed in the plates 19, the said take-up roller 28 resting by gravity on the friction rollers 24 and 25. If desired, and to assure firm contact between the take-up roller 28 and the said friction rollers, an additional weighted roller 30 may be mounted in the said inclined slots 29 to press downwardly upon the take-up roller 28 and assure firm contact.

Figures 9, 10, 11:
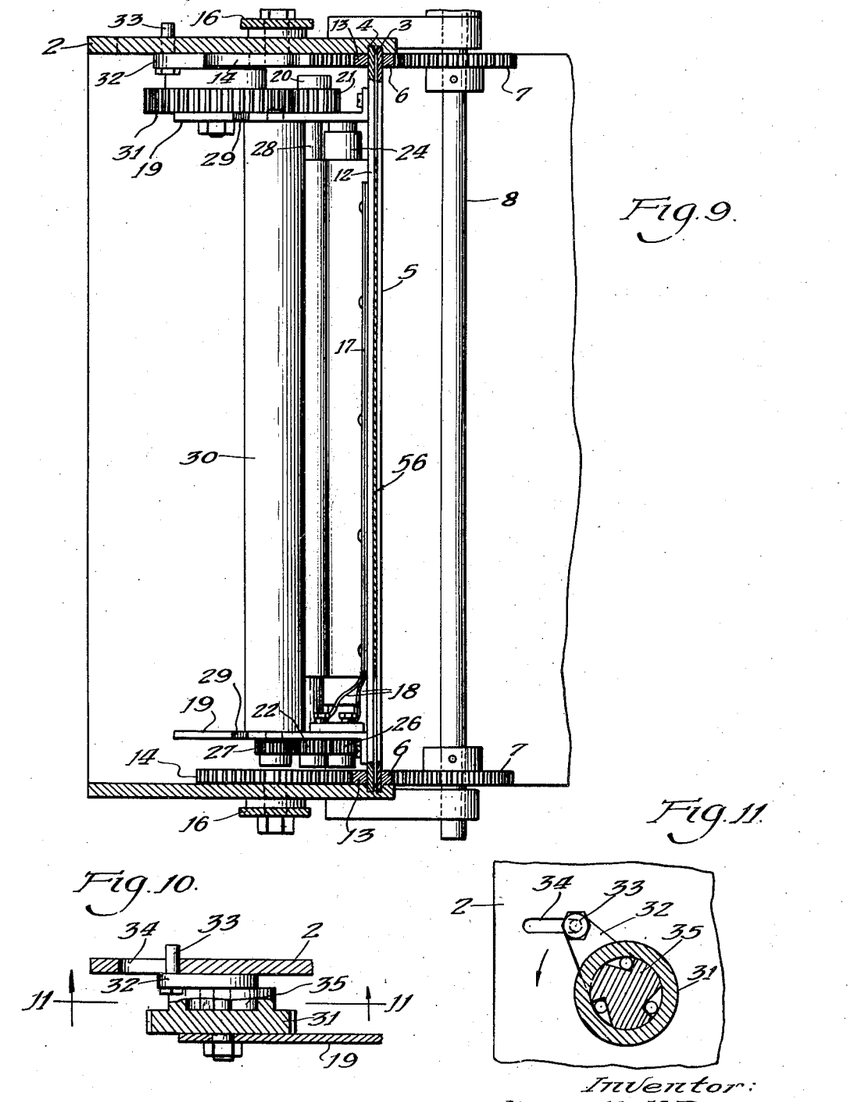
Fig. 9 is a plan view taken substantially on line 9—9 of Fig. 3.
Fig. 10 is a fragmentary detail partly in section and partly in elevation showing the gear which operates the backing sheet take-up mechanism and the clutch therefor.
Fig. 11 is a view in section taken on line 11—11 of Fig. 10.
Figures 12, 13:
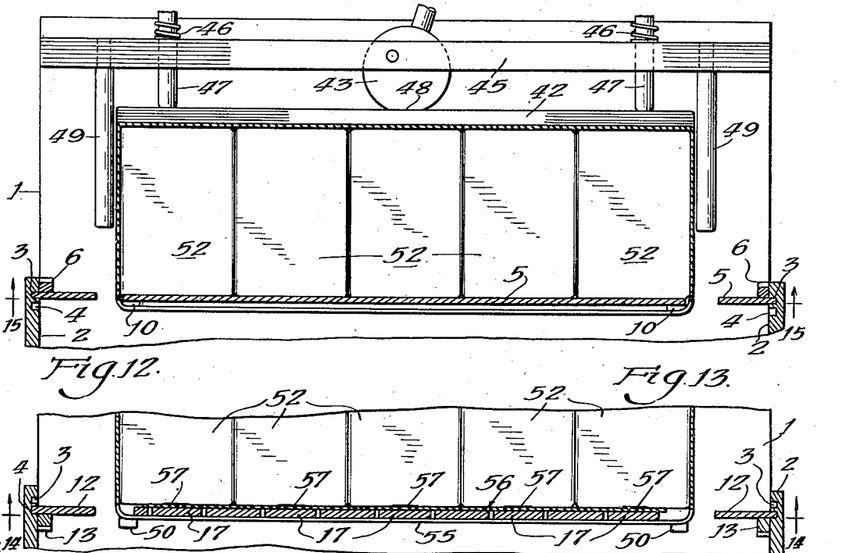
Fig. 12 is a plan view partly in section showing the position of the shearing blade as it is opening the carton or container.
Fig. 13 is a view principally in section taken substantially on line 13—13 of Fig. 3.

To operate the take-up mechanism for the backing sheet, I provide a gear 31 mounted on one of the plates 19 and connected to a lever 32 having a pin 33 slidable in a slot 34 in the side plate 2. The connection of the gear 31 to the lever 32 is through a clutch generally indicated by the reference numeral 35. (See Figs. 10 and 11.) This clutch may be of any preferred form although I have chosen to illustrate a clutch of the roller and pocket type. Obviously, any form of ratchet clutch mechanism may be employed which will free the gear 31 when in one position and will cause it to rotate when in the other position.

The foregoing arrangement is such that, when the blade 12 moves downwardly and carries with it the plates 19, the said gear 31 is held against rotation and therefore the backing sheet take-up mechanism is inoperative. Upon upward movement of the blade 12, which occurs after the decalcomania have been affixed, the gear 31 rotates and in turn rotates the gear 22 on the shaft 20. By this arrangement, the gears 26 and 27 are rotated to cause rotation of the friction rollers 24 and 25.

It is to be noted that when the blade 12 moves upwardly and the backing sheet moves rearwardly over the friction roller 24 and around the take-up roller 28, there results a compound movement of the backing sheet which can best be described as a peeling movement. This is for the purpose of removing the backing sheet after the decalcomania have been transferred and to do it in such a manner as not to disturb or mutilate the decalcomania. This peeling movement is preferable for this purpose as compared to any straight movement of the backing sheet, either vertically or horizontally, away from the transferred decalcomania.

Decalcomania are supplied from a roll 36 mounted in a suitable bracket 37 at the top of the plates 2. From the roll 36, the sheet of decalcomania extends over a tension roller or stretcher bar 38, thence downwardly across the front face of the blade 12 around the bottom edge of the said blade and the heating elements there located, thence upwardly around the friction roller 24 and to the take-up roller 28.

In order to prevent over-running of the feed roll 36 and to assure a smooth and even withdrawal of the sheet therefrom, I provide a pressure member or friction brake 39 adjustable by a set screw 40 on a rod 41 extending between the side plates 2.

Figure 1:
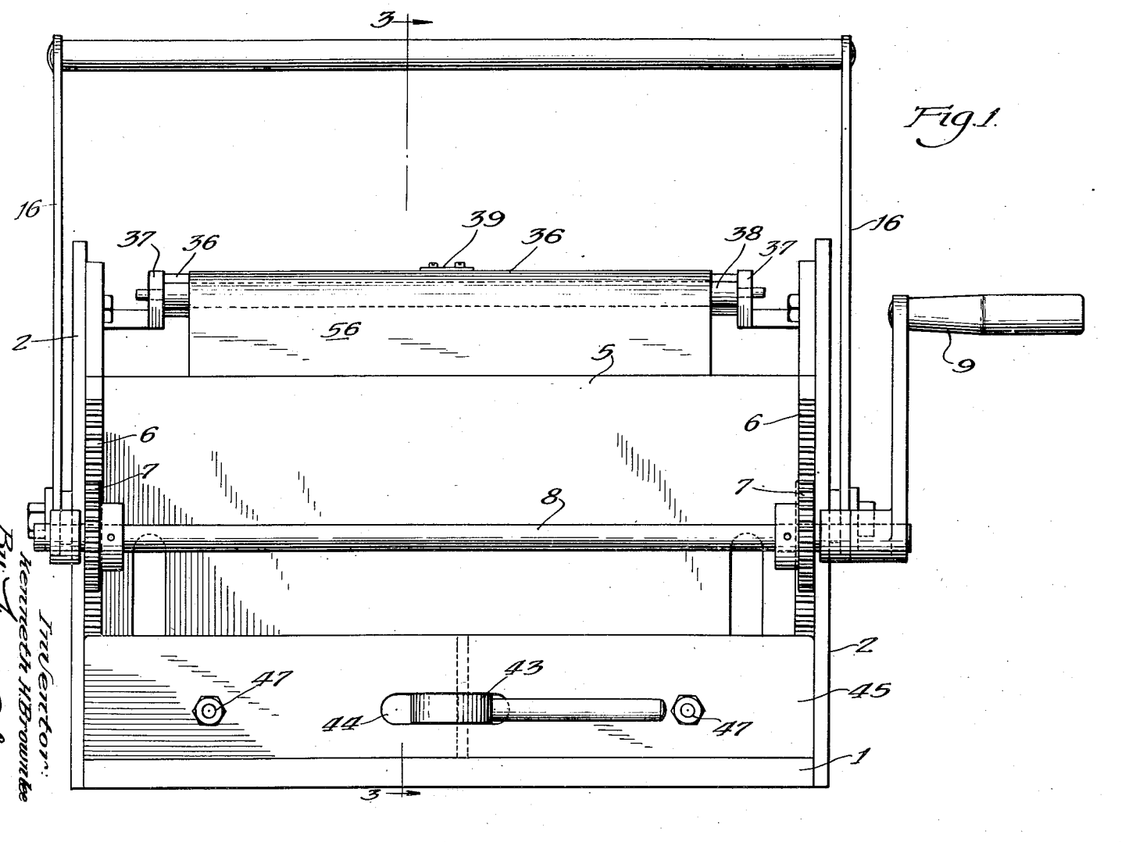
Fig. 1 is a front elevation of a machine embodying my invention.
Figure 2:
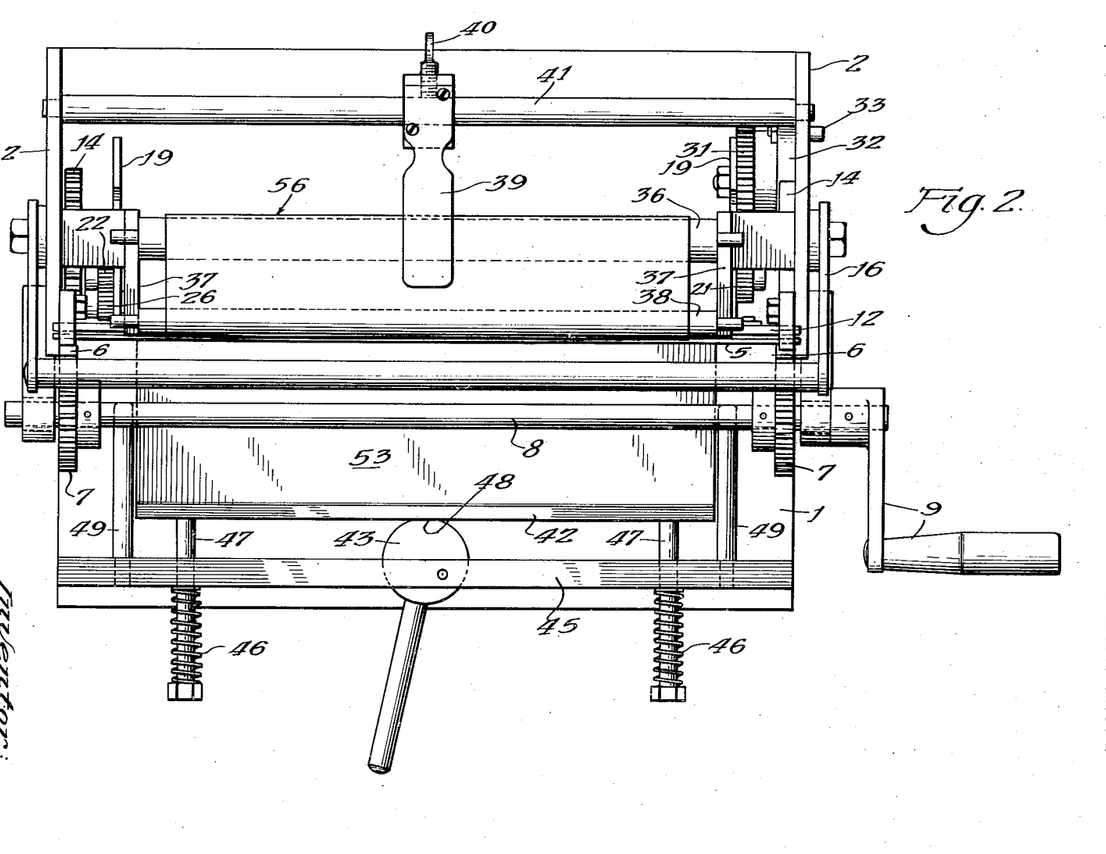
Fig. 2 is a plan view of the machine shown in Fig. 1 showing the position of a cigarette carton at the time when the transfers are applied to the packages.

At the front of the machine, I provide a presser plate 42 operable by a cam lever 43 which is eccentrically mounted in a slot 44 in a supporting bracket 45. The presser plate 42 is normally held against the bracket 45 by springs 46 operating on pins 47 which are attached to the presser plate 42 and extend through suitable openings in the bracket 45. By this arrangement, the presser plate 42 is moved away from the bracket 45 by turning the cam lever 43, as shown particularly in Fig. 2. This movement of the presser plate is against the action of the springs 46 which latter are thereupon compressed against the bracket 45. Upon release of the cam lever 43, said springs 46 will return the presser plate to its normal position substantially in contact with the bracket 45.

If desired, the cam lever 43 may have a flat face as at 48 (see Fig. 2) so as to provide for uniform contact with the plate 42 over a substantial area.

The bracket 45 is provided with a pair of guide pins 49 which serve to guide the plate 42 in its movements and which also substantially define and limit the length of the carton or container which may be inserted in the machine and help accurately to position the said carton or container therein.

The base or bedplate 1 is also preferably provided with a plurality of stop lugs 50 (see Figs. 3 and 6) which are for the purpose of limiting rearward movement of the carton or container and which serve also accurately to position the same with respect to the shearing blade 5 and the stamp-applying blade 12.

Having now described the mechanical elements of my new machine, I will proceed to describe its mode of operation, pointing out particularly how the machine is adapted to carry out my new method.

As I have heretofore indicated, my method contemplates the use of heat transferable decalcomania. Such decalcomania comprise, generally speaking, a backing sheet usually of some kind of paper which is impregnated or coated with a suitable wax or wax compound having a relatively low melting point. Upon this backing sheet, one or more printed impressions are made and then a layer of gum or some suitable adhesive is applied. When heat is applied to a backing sheet of this type, the wax coating will melt and the printed impression with the layer of gum or adhesive thereon will be released from the backing sheet and transferred to the object with which it has been placed in contact.

As heretofore indicated, I have chosen to illustrate and describe my invention as applied to the problem of affixing revenue stamps to the individual cigarette packages contained within a carton. As is well known, a carton of cigarettes contains normally ten packages arranged in two rows of five each. By my method and apparatus, it is possible to apply a revenue stamp to each of the ten packages within the carton simultaneously, and without removing the packages from the carton.

Continuing the description of the method and the operation of the machine, and again referring to the drawings, the reference character 51 indicates generally a carton or container for cigarette packages 52. The carton has a cover 53 with an inturned flap 54 which, when the carton is closed, lies against the inside of the front wall 55.

As the cartons come to the distributor whose duty it is to apply the revenue stamps, the cartons are closed and the inturned flap 54 is secured to the front wall 55 by one or more spots of adhesive.

The first step in my procedure is to shear open the carton. This I accomplish by placing the carton on the base 1 of my machine between the guide rods 49 and pressing the carton against the stop lugs 50. The carton is then in position for the shearing blade 5 to perform the opening operation. This is accomplished by turning the handle 9 to cause the shearing blade 5 to descend in the guide grooves 3. The cutting edge of the blade 5 enters between the front of the cover flap 54 and the inside surface of the front wall 55 breaking the adhesive contact between these surfaces. Because the lower corners of the shearing blade 5 are provided with the bosses or lugs 10, the front wall 55 will be bowed outwardly, as best shown in Fig. 7.

While the shearing blade is in its lower position, and after it has effected separation of the cover flap from the front wall, the handle 16 is rotated to cause the stamp-applying blade 12 to move downwardly in its guide grooves 4 and to enter into the carton in the space between the front wall 55 and the back surface of the shearing blade 5. Thus, the stamp-applying blade is in position to affix the revenue stamps.

The next step in the procedure is to turn the handle 9 to raise the shearing blade 5 in its guide grooves 3. When the said shearing blade 5 thus moves upwardly, the lugs or projections 11 engage the edge of the inturned flap 54 and thus raise the same out of contact with the cigarette packages 52. Thus, the ends of the packages 52 are exposed directly to contact with the decalcomania on the backing sheet.

As heretofore explained, the decalcomania are supplied from a roll 36 mounted near the top of the machine. The backing sheet carrying the transfers leads over the stretcher bar or roller 38 and then passes downwardly in contact with the front face of the blade, around the bottom edge of the latter and thence to the take-up mechanism heretofore described.

In Fig. 5, I have illustrated a portion of a sheet of decalcomania with the impressions arranged in a manner particularly applicable to the problem of affixing them to the cigarette packages within a carton. As will be seen by reference to said Fig. 5, the sheet 56 is provided with a plurality of decalcomania stamps arranged in columns and rows. Assuming that the bottom row of stamps shown in Fig. 5 is in position for application, the stamps marked 57 will be applied to the packages of cigarettes in the lower row and the stamps marked 58 will be applied to the packages in the upper row.

Because the cost of paper is a very important item in the production of decalcomania, it would be wasteful so to arrange the stamps as to have only enough in one row for five packages of cigarettes, considering the fact that a package of cigarettes is normally a little more than two inches wide. Hence, I arrange the stamps 57 on approximately two-inch centers and between adjacent stamps, I provide an additional series of stamps marked 59, which are also on approximately two-inch centers. Similarly, an additional set of stamps 60 is located between the stamps 58 of the upper row. By this arrangement I utilize a large part of the backing sheet which otherwise would be wasted.

It will be observed, too, that the heating elements 17 (see Fig. 14) are so arranged on the stamp-applying blade 12 and are of such width as to overlie only one set of stamps in a row, for example, the stamps 57 in the lower row and the stamps 58 in the upper row. After a set of stamps has been applied in one series of operations, the take-up roll may be lifted out of the slots 29 and, after turning the roll axially, it may be placed in the bracket 37 where it then becomes the supply roll. When the roll is so turned axially, the adjacent sets of stamps 59 and 60 come into register with the heating elements 17.

Or, instead of axially turning the roll, I may provide an additional set of heating elements which will be located in the space between the elements 17 so that on the re-running of the roll, the said additional elements will cause transfer of the sets of stamps 59 and 60. Where such a set of additional heating elements is employed, it is desirable to have them controlled by a separate switch so that they will not be heated while the elements 17 are in use and so that the elements 17 will not be heated when the additional row of elements is used.

Returning now to the description of the operation of the machine and the method: When the cover flap 54 has been elevated by the shearing blade 5 into the position shown in Fig. 3, the ends of the cigarette packages 52 are in contact with the stamps on the sheet 56. Thereupon, the operator turns the cam lever 43 which forces the presser plate 42 against the carton and moves the packages firmly into contact with the stamp sheet. This brings the sheet into firm contact with the heating elements 17, whereupon the wax coating melts and the decalcomania are freed from the backing sheet and transferred to the ends of the packages 52, the finished product being illustrated in Fig. 4.

Because I contemplate that the stamp may carry a suitable heat-responsive adhesive, it will firmly attach to the package. Also, because the stamp is in the form of a thin film, it will readily conform to the surface of the package even though the stamp might overlie a folded flap, as shown in Fig. 4.

It will be understood, of course, that in this operation a stamp will be applied to each of the ten packages in the carton simultaneously.

It will also be understood that, because the heat is confined substantially to the immediate area of the sheet which carries the stamps to be transferred, the wax coating on the adjacent area carrying the additional stamps will not be sufficiently heated to melt and therefore the additional sets of stamps will not be mutilated or in any way adversely affected by the operation which has just been described.

After the application of the stamps, the operator releases the cam lever 43, whereupon the presser plate 42 is returned to its normal position by the springs 46 operating on the pins 47.

The next step is to raise the stamp-applying blade out of the carton. This is done by turning the handle 16 in the direction shown in Fig. 6. By so turning the handle 16, the backing sheet take-up carriage 19 which is fixed to the blade 12 moves upwardly and, as heretofore explained, rotation of the gear 31 causes rotation of the feed rollers for taking up the used part of the backing sheet. In this connection, it will be observed that there will be both an upward and rearward movement of the sheet 56 which, as I have heretofore stated, is best described as a peeling motion by which the used portion of the sheet is removed in such a manner as not to affect the stamps which have been transferred to the ends of the packages.

It will be noted that, as the stamp-applying blade 12 is moved upwardly from the position shown in Fig. 3 to the position shown in Fig. 6, the length of the web of the backing sheet from the supply roll 36 to the bottom edge of the said blade 12 is shortened. So much of the original length of the backing sheet as was occupied by the transferred decalcomania is taken up on the take-up roller 28. When in the next succeeding operation the stamp-applying blade is moved downwardly, the length of the web of the backing sheet must be increased and this is accomplished by drawing such required additional length from the supply roll 36. As heretofore indicated, when the blade 12 moves downwardly, the take-up mechanism is held inactive by reason of the clutch 35 which controls the gear 31 and prevents its rotation on such downward movement.

The length of the stroke or movement of the blade 12 may be regulated by any suitable adjustable stop (not shown). Of course, the gearing ratio of the take-up mechanism is so related to the length of movement of the blade 12 as to provide for the taking up of just the right amount of the backing sheet at each successive operation.

The foregoing describes completely the operation of applying decalcomania stamps to the individual packages contained within a carton, from the initial opening of the carton to the final application of the stamps. This complete cycle of operations is repeated as additional cartons are successively put into the machine.

It is believed that the foregoing description is adequate to make my invention clear to those skilled in the art. It will be seen that I have provided a very simple, compact and inexpensive machine for rapidly applying decalcomania to a plurality of articles simultaneously. Also by the use of heat transferable decalcomania, the application is greatly facilitated and expedited.

A machine embodying my invention may, of course, be employed for many other purposes than the herein described application of revenue stamps to cigarette packages in a carton. Other articles or individual packages enclosed in containers may have decalcomania stamps or labels affixed by my method and my machine. So far as the application of decalcomania is concerned, it will be understood that it is not necessary that carton or container-opening mechanism be employed. It will be clear also that the cartons or containers may be otherwise opened, either manually or by a different machine and the decalcomania affixed by the transfer-applying mechanism herein described.

As heretofore stated, I do not limit myself to any particular form of decalcomania although I have indicated that with my machine and method a declacomania of the heat transferable type is preferred. However, to those skilled in the art, it will readily be apparent that many of the principles of my machine and its structural elements may be employed in connection with water transferable decalcomania, especially where such decalcomania are printed upon a very light backing sheet so that very little moisture is required to release the decalcomania. Such features as supplying the decalcomania from a roll, introducing the backing sheet into a container or positioning the sheet adjacent the articles, peeling the backing sheet away after the transfer has been made, positioning the container, if one is used, and opening the container, are all features which may be employed in connection with water transferable decalcomania.

The machine herein illustrated and described is so constructed and operates in such a manner as to apply transfers to ten individual packages or articles arranged in two rows of five each. It will, of course, be clear that the proportions of the machine may be so arranged as to apply almost any number of transfers simultaneously to any number of articles arranged in any desired number of columns and rows. In any such modification of the machine, the transfers will be arranged on the backing sheet and the heating elements will be so arranged as properly to apply the desired number of transfers in the desired places.

I claim as my invention:

1. The method of applying transfers to articles within a container, which comprises inserting a sheet of transfers into said container adjacent the articles, and applying heat to said sheet to cause said transfers to leave said sheet and attach to said articles.

2. The method of applying revenue stamps to the individual packages of cigarettes enclosed within a carton, which comprises opening the carton sufficiently to permit introduction of a sheet of revenue stamps, introducing a sheet of revenue stamps into said carton while it is so open and in position adjacent the ends of the packages, applying heat to said sheet to transfer the stamps from said sheet to said packages, and removing the sheet from the carton.

3. In a machine for applying transfers to articles enclosed within a container, a base, a pair of supports thereon, a container-opening blade mounted between said supports for reciprocal movement with respect to said base, a transfer-applying blade mounted between said supports for reciprocal movement with respect to said base, and heating means carried by said transfer-applying blade.

4. In a machine for applying transfers, a base, a pair of supports thereon, a transfer-applying blade mounted between said supports for reciprocal movement with respect to said base, means for reciprocating said blade, heating means carried by said blade, and means on said base for accurately positioning an article to which a transfer is to be applied.

5. In a machine for applying transfers to articles enclosed within a container, a base, a pair of supports thereon, a container-opening blade mounted between said supports for reciprocal movement with respect to said base, a transfer-applying blade mounted between said supports for reciprocal movement with respect to said base, heating means carried by said transfer-applying blade, and means on said base for accurately positioning a container with respect to said blades.

KENNETH H. BROWNLEE.

REFERENCES CITED

The following references are of record in the file of this patent:

UNITED STATES PATENTS

| Number | Name | Date |
|---|---|---|
| 1,086,401 | Richardson | Feb. 10, 1914 |
| 1,086,402 | Richardson | Feb. 10, 1914 |
| 1,922,852 | Humphrey | Aug. 15, 1933 |
| 1,973,101 | Ready | Sept. 11, 1934 |
| 1,988,937 | Chadwick | Jan. 22, 1935 |
| 2,117,618 | Malocsay | May 17, 1938 |
| 2,219,071 | Humphner | Oct. 22, 1940 |
| 2,265,659 | Wittneble | Dec. 9, 1941 |
| 2,353,352 | Muir | July 11, 1944 |